March 3, 1970 D. O. COREY Re. 26,808

METHOD AND APPARATUS FOR MIXING AND BLENDING AN EXPLOSIVE FROM DIVERSE COMMINUTED MATERIALS

Original Filed Nov. 18, 1963 2 Sheets-Sheet 1

INVENTOR

Dwight O. Corey

BY

Mason, Fenwick & Lawrence

ATTORNEYS

INVENTOR
Dwight O. Corey

BY
Mason, Fenwick & Lawrence
ATTORNEYS

United States Patent Office

Re. 26,808
Reissued Mar. 3, 1970

26,808

METHOD AND APPARATUS FOR MIXING AND BLENDING AN EXPLOSIVE FROM DIVERSE COMMINUTED MATERIALS

Dwight O. Corey, Memphis, Tenn., assignor to Pace Corporation, Memphis, Tenn., a corporation of Michigan Original No. 3,331,275, dated July 18, 1967, Ser. No. 324,404, Nov. 18, 1963. Application for reissue July 18, 1968, Ser. No. 753,805
Int. Cl. F42b *33/00;* B01f *11/00*
U.S. Cl. 86—1 14 Claims

Matter enclosed in heavy brackets [ ] appears in the original patent but forms no part of this reissue specification; matter printed in italics indicates the additions made by reissue.

*ABSTRACT OF THE DISCLOSURE*

*Component materials for making an explosive are deposited in a charge case which is sealed to prevent leakage of the materials and the case is then orbited while maintaining the axis of the case in a preselected attitude relative to a fixed line lying in the plane defined by the orbital movement of the axis.*

This invention relates to a method and apparatus for mixing and blending diverse comminuted materials and more particularly to a method and apparatus for mixing and blending explosive comminuted materials for provide a uniform mixture thereof.

In the manufacture of explosives, the explosive composition generally is produced by mixing and blending various comminuted or granular component materials. Often, such comminuted materials are not harmful in their free or uncombined state, but become explosive when mixed and blended. In the prior art it has been the practice normally to mix and blend such component materials by depositing them in predetermined amounts in tumbling container and tumbling the materials to provide the desired mixing and blending. The mixed and blended materials then are transferred to charge cases which are capped and crimped to complete the explosive product. Such a method of making explosives, however, has been found to be extremely hazardous, in that the explosive materials are likely to ignite or explode at any stage of production. It has been found that the probability of explosion or combustion particularly is high during the tumbling operation, during the transfer of the blended material from the tumbling container to the charge case and when the cap is inserted in the charge case and the open edges of the case are crimped to firmly secure the cap.

Accordingly, it is the principal object of this invention to provide an improved method and apparatus for making explosive products.

Another object of this invention is to provide an improved method and apparatus for mixing and blending explosive comminuted materials in making explosive products.

A further object of this invention is to provide an improved method and apparatus for mixing and blending explosive comminuted materials to provide a uniform blending of such materials.

A still further object of this invention is to provide an improved method and apparatus for making an explosive product from highly flammable or explosive materials which reduces the probability of an explosion during the production of the explosive product.

A still further object of this invention is to provide an improved method and apparatus for making a photoflash product.

Another object of this invention is to provide a photoflash product having increased illuminescence in comparison to conventional comparable products.

Other objects and advantages of the present invention will become more apparent to those persons skilled in the art in the following description when taken in conjunction with the accompanying drawings, wherein.

In accordance with the broad aspect of the present invention, there is provided a method of making an explosive from highly flammable or explosive materials, generally comprising depositing the component materials in a charge case, sealing the case to prevent leakage of the contents, and subjecting the case containing such materials to forces applied in diverse directions. It is preferred that the component materials be deposited within the charge case in layers or strata in ascending specific gravities and the charge case containing such materials be subjected to forces applied longitudinally and transversely, which will cause the materials having a higher specific gravity to migrate and become interspersed among those materials of lower specific gravities. It is contemplated that the forces applied to the charge case to cause such flow or migration of the comminuted materials be provided by an suitable means, including vibrating and orbiting the charge case containing the materials.

Figure 1:
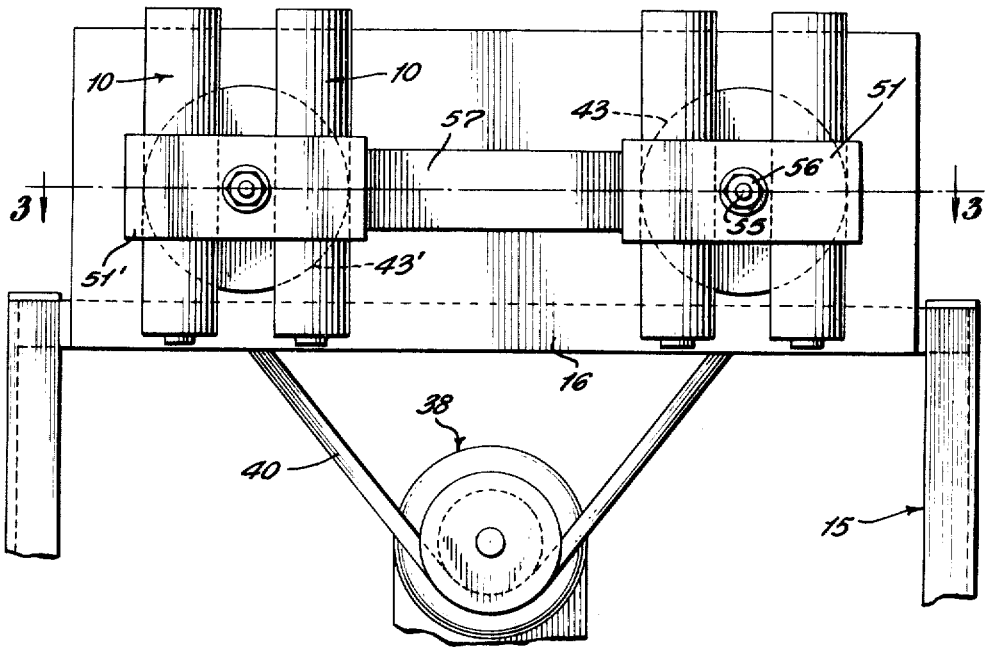
FIGURE 1 is a front view of the apparatus used in practicing the method of the present invention, having portions thereof broken away.
Figure 2:
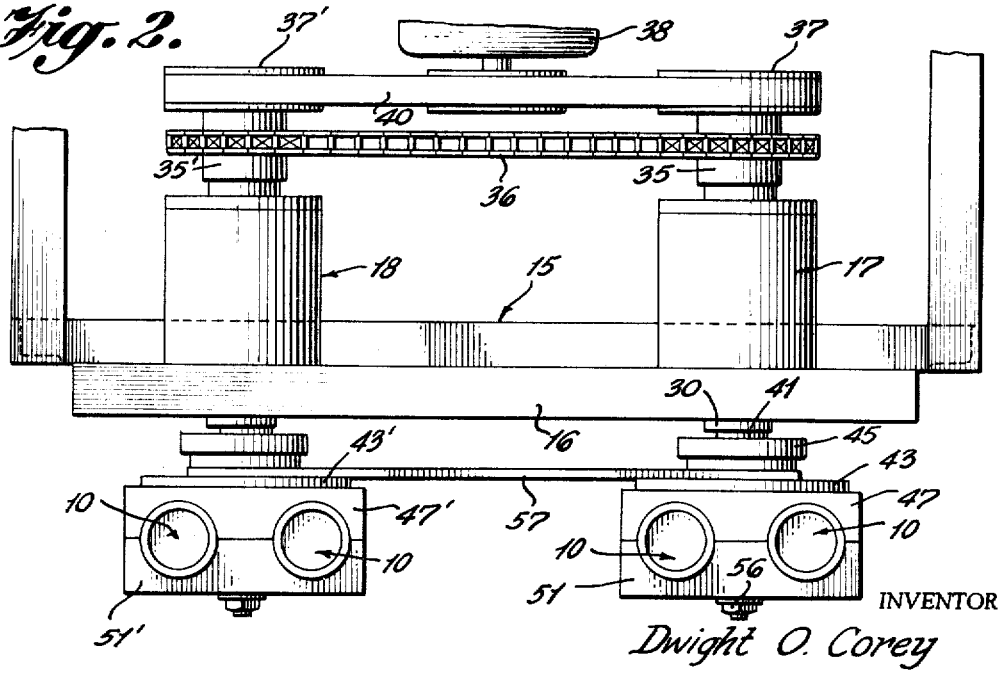
FIGURE 2 is a top plan view of the apparatus illustrated in FIGURE 1.
Figure 3:
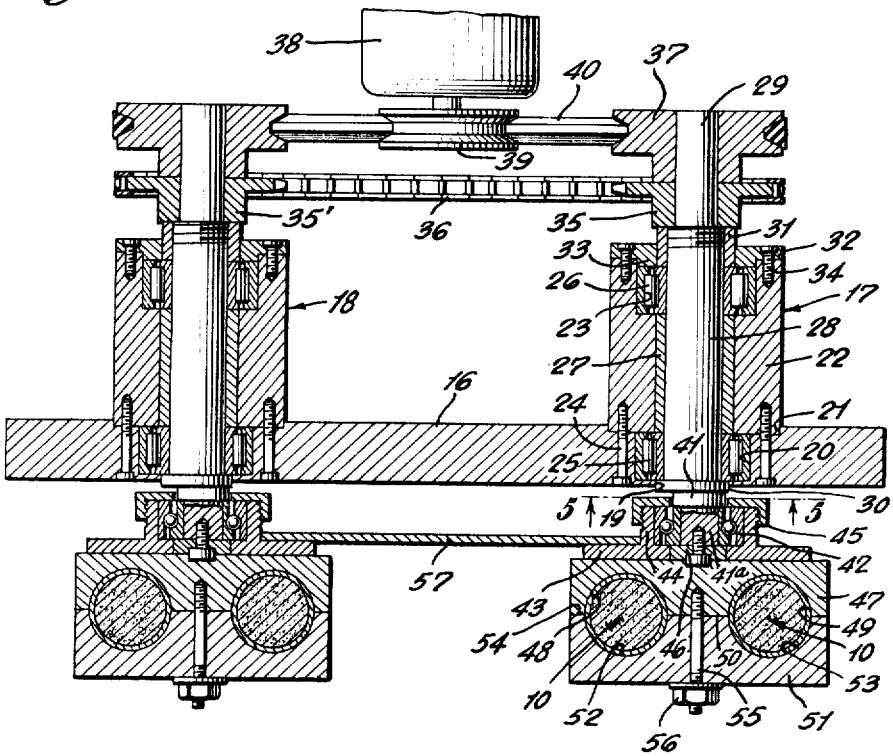
FIGURE 3 is a cross-sectional view taken along line 3—3 in FIGURE 1.
Figure 4:
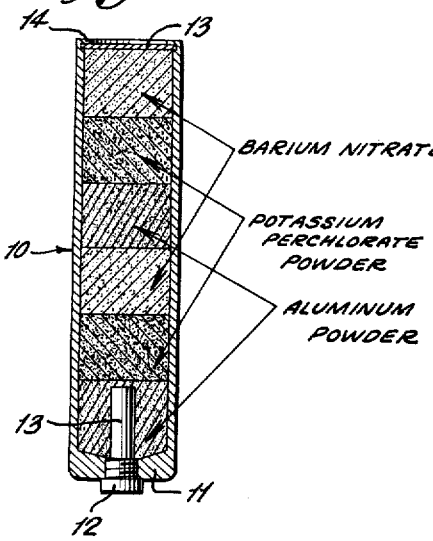
FIGURE 4 is a vertical cross-section of a charge case containing the component materials prior to the mixing and blending operation.
Figure 5:
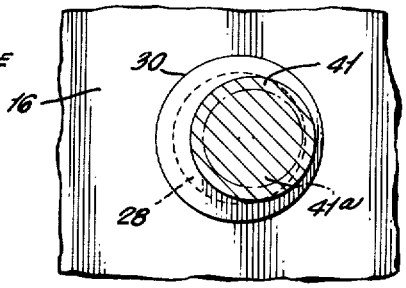
FIGURE 5 is a cross-sectional view taken along line 5—5 in FIGURE 3.

Specifically, in practicing the method of the invention to produce a photoflash product, the component materials including 40% by weight aluminum powder, 30% by weight potassium perchlorate, and 30% by weight barium nitrate are deposited in a cylindrical aluminum charge case 10 in strata, as illustrated in FIGURE 4 of the drawings. The component materials are introduced into the charge case in the order of ascending specific gravities with the aluminum powder having the lowest specific gravity deposited on the bottom, the potassium perchlorate deposited as the next layer, and the barium nitrate deposited on the potassium perchlorate. As illustrated in FIGURE 4, two sets of strata as described, may be provided in a single charge case. Threadedly mounted in the bottom wall 11 is a brass detonating fuse 12, having a portion 13 containing a suitable explosive composition, preferably 95.5% by weight barium chlorate and 4.5% by weight boron, which extends into the bottom layer of aluminum. The charge case is sealed by placing an aluminum cap 13 on the top layer of material and crimping the upper end 14 of the charge case to firmly secure the aluminum cap 13. The charge case, as illustrated in FIGURE 4, then is mounted in a blending apparatus as illustrated in FIGURES 1 through 3, which is operable to rapidly rotate the charge case in a smooth orbital path, thereby applying longitudinal and transverse forces to the particles within the casing. The forces applied by the rapid orbital movement of the charge case cause the barium nitrate particles having the highest specific gravity and to a lesser extent the potassium perchlorate particles having a specific gravity greater than the aluminum particles, to migrate downwardly, causing them to become interspersed within the case, thereby providing a uniform mixing and blending of the materials within the casing. The radius of the orbital path, the speed of the orbital motion and the orbiting time are adjusted to provide the desired uniform mixing and blending.

Referring to FIGURES 1 through 3 and 5, there is shown an apparatus for mixing and blending the materials contained in a charge case, as described. The apparatus specifically comprises a frame member 15, having a vertically disposed mounting plate 16 on which there is mounted a pair of units 17 and 18 which are identical in construction and which are adapted to operate in synchronization. Although the construction and operation of the unit 17 will be described hereinafter, it is to be understood that the unit 18 has an identical construction and operation.

The mounting plate 16 is provided with a horizontal opening 19, having an enlarged bore 20 and a rearwardly disposed bore 21. Mounted on the mounting plate 16 within the bore 21 is a cylindrical bearing housing 22, having an enlarged bore 23 disposed at the rearward end thereof. The bearing housing is supported at its forward end by means of a plurality of bolts 24. Mounted in the bore 20 in the mounting plate and in the bore 23 of the bearing housing, respectively, are bearing members 25 and 26 spaced apart by means of a cylindrical bearing spacer 27. Journaled in the bearings 25 and 26 is a shaft 28, having a reduced rear end portion 29 and a collar 30 disposed at the forward end thereof which is disposed in the opening 19 of the vertical mounting plate. The bearing member 26 is locked in position by means of a lock nut 31 threadedly engaged on the rearward end of the enlarged portion of the shaft 28, and an annular retainer member 32 having a hub portion 33 engaging the bearing member 26. The retainer member 32 is rigidly secured to the bearing housing by means of a plurality of bolts 34. Mounted on the reduced portion 29 of the shaft 28 is a sprocket member 35 which is operatively connected to the sprocket member 35' of the unit 18 by means of a timing chain 36 to provide synchronous drive between the drive shafts of the two units. Also mounted on the reduced portion 29 of the shaft 28 is a pulley 37 which is driven by a suitable motor 38, having a pulley 39 by means of a drive belt 40. As illustrated in the drawings, the motor 38 is adapted to drive the shafts of both of the units 17 and 18 by means of the drive belt 40.

The forward end of the shaft 28 is provided with a stub shaft 41 having a parallel axis offset radially relative to the axis of shaft 28. The stub shaft 41 is provided with a reduced end portion 41a on which there is mounted a bearing member 42. A circular mounting plate 43 having an annular flange portion 44 is rotatably mounted in the bearing member 42. The flange portion has an externally threaded portion for threadedly mounting a bearing lock nut 45 thereon. The forward end of the bearing 42 is engaged by a bearing retainer washer 46, which is secured to the reduced portion of the stub shaft by a suitable bolt.

Rigidly mounted on the front face of the mounting plate 43 is a clamping block 47, having a pair of parallel grooves 48 and 49 in the front face 50 thereof, each having a semicircular cross-sectional configuration. The clamping block 47 cooperates with a clamping block 51, having similar grooves 52 and 53 in an opposed surface 54, which engages the front face 50 of the clamping block 47 so that corresponding grooves register to form clamping surfaces for a pair of cylindrical charge cases. The block 47 is provided with a clamping bolt 55 disposed axially relative to the axis of stub shaft 41, which extends through a suitable opening in clamping block 51. The threaded end of the bolt 55 is provided with a nut 56 for rigidly clamping blocks 47 and 51 together.

The axes of the circular openings in the clamping blocks provided by the registered grooves in the abutting faces thereof are maintained in a vertical orientation by means of a tie bar 57 which interconnects mounting plates 43 and 43' of the units 17 and 18 and prevents the rotation of the mounting plates. It will be appreciated that as the mounting plates carrying the clamping blocks are orbited by means of their respective shafts, the charge cases 10 clamped therein will be maintained in a vertical orientation so that axial and radial forces will be applied to the particles within the cases.

In view of the fact that the detonating fuses are sensitive to abrupt jolts and jars, which would tend to detonate the same, it is important to eliminate any excessive vibrations within the apparatus. This essentially is accomplished by journaling the shafts of the units in bearings as described and providing the timing chain 36, which synchronizes the drive of the shafts. The timing chain 36 operates to provide a smooth orbiting motion of the cylindrical charge cases, eliminating the effects of undesirable vibrations in the frame of the apparatus. Although only two cases are shown mounted in each set of clamping blocks of each unit, it will be appreciated that modifications of the clamping block are possible to accommodate additional charge cases.

Although the speed of the shafts will depend to a large extent on the size of the units and particularly the radius of the orbital path, it has been found that suitable mixing and blending results can be obtained by orbiting the charge cases at 2400 revolutions per minute, *a preferred speed for the apparatus shown in FIGS. 1–3 and 5.* It also has been found that the proposed novel method of mixing and blending such explosive materials can be provided by otherwise applying forces for interspersing the particles, including agitating or vibrating the cases. The mixing and blending particularly can be suitably accomplished by *agitating or* vibrating the cases at *frequencies up to and including* ultrasonic frequencies [and preferably at 2400 vibrations per minute].

From the foregoing detailed description will be evident that there are a number of changes, adaptations and modifications of the present invention which comes within the province of those skilled in the art. [However, it is intended that all such variations not departing from the spirit of the invention be considered as within the scope thereof as limited solely by the appended claims.]

What I claim is:

1. A method of making an explosive comprising depositing the component materials in a charge case, sealing the case to prevent leakage of said materials and orbiting the case containing said materials while maintaining the axis of the case in a preselected attitude relative to a fixed line lying in the plane defined by the orbital movement of the axis.

2. The product made by the method of claim 1.

3. A method of making an explosive comprising depositing the component materials in a charge case, sealing the case to prevent leakage of said materials and orbiting the case containing said materials at 2400 revolutions per minute while maintaining the axis of the case in a preselected attitude relative to a fixed line lying in the plane defined by the orbital movement of the axis.

4. The product made by the method of claim 3.

5. A method of making an explosive comprising depositing 40% by weight aluminum powder, 30% by weight potassium perchlorate powder and 30% by weight barium nitrate in a cylindrical charge case having a closed end including a detonating fuse and an open end, placing a cap on the materials deposited within the case, crimping the upper end of the case to firmly secure the cap and orbiting the case [at 2400 revolutions per minute] while maintaining the axis of the case in a preselected attitude relative to a fixed line lying in the plane defined by the orbital movement of the axis.

6. The product made by the method of claim 5.

7. A method of making an explosive comprising depositing the component materials in a charge case in strata in ascending specific gravities, securing the case to prevent leakage of said materials and orbiting the case containing said materials while maintaining the axis of the case in a preselected attitude relative to a fixed line lying in the plane defined by the orbital movement of the axis.

8. The product made by the method of claim 7.

9. A method of making an explosive comprising depositing the component materials in a charge case in strata of ascending specific gravities, sealing the case to prevent leakage of said materials and orbiting the case containing said materials at 2400 revolutions per minute while maintaining the axis of the case in a given attitude relative to a fixed line lying in the plane defined by the orbital movement of the axis.

10. The product made by the method of claim 9.

11. A method of making an explosive comprising depositing 40% by weight aluminum powder, 30% by weight potassium perchlorate powder and 30% by weight barium nitrate in a cylindrical charge case having a closed end including a detonating fuse and an open end, in strata in ascending specific gravities, crimping the upper end of the case to firmly secure the cap and orbiting the case at 2400 revolutions per minute while maintaining the axis of the case in a given attitude relative to a fixed line lying in the plane defined by the orbital movement of the axis.

12. The product made by the method of claim 11.

13. A method of making an explosive comprising depositing 40% by weight aluminum powder, 30% by weight potassium perchlorate powder and 30% by weight barium nitrate in a cylindrical aluminum charge case having a closed end including a brass detonating fuse containing 95.5% by weight barium chromate and 4.5% by weight boron and an open end, said materials deposited within the case disposed in strata disposed transversely relative to the length of said case in ascending specific gravities, compressing said materials deposited within said case, placing an aluminum cap on the materials deposited within the case, crimping the upper end of the case to firmly secure the cap to provide an integral unit and orbiting the case in a vertical plane at 2400 revolutions per minute while maintaining the axis of said case in a preselected attitude relative to a fixed line lying in said vertical plane.

14. The product made by the method of claim 13.

References Cited

The following references, cited by the Examiner, are of record in the patented file of this patent or the original patent.

UNITED STATES PATENTS

| | | | |
|---|---|---|---|
| 304,022 | 8/1884 | Peck | 259—49 |
| 1,706,176 | 3/1929 | Lenart | 259—49 |
| 2,646,975 | 7/1953 | Waldvogel. | |
| 2,910,865 | 11/1959 | Opdyke | 149—41 |
| 3,017,300 | 1/1962 | Herring | 149—41 |
| 3,037,417 | 6/1962 | Andrew et al. | 86—1 |
| 3,049,043 | 8/1962 | Milani et al. | 86—1 |
| 3,128,082 | 4/1964 | Cline. | |
| 3,142,253 | 7/1964 | Seavey et al. | 149—22 |
| 1,744,751 | 1/1930 | Clark | 86—20.1 |
| 2,050,560 | 8/1936 | Chapman | 259—49 |
| 2,405,487 | 8/1946 | Brandt | 259—72 |
| 2,775,987 | 1/1957 | Bohlman et al. | |
| 2,807,975 | 10/1957 | Bohlman et al. | 89—20 X |

OTHER REFERENCES

Sears & Zemansky, University Physics, 2nd ed., pp. 99–103.

BENJAMIN A. BORCHELT, Primary Examiner

S. C. BENTLEY, Assistant Examiner

U.S. Cl. X.R.

259—72